United States Patent
Roberts (10) Patent No.: US 11,936,616 B2
(45) Date of Patent: *Mar. 19, 2024

(54) ASSIGNING VARIABLE LENGTH ADDRESS IDENTIFIERS TO PACKETS IN A PROCESSING SYSTEM

(71) Applicant: ADVANCED MICRO DEVICES, INC., Santa Clara, CA (US)

(72) Inventor: David A. Roberts, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/496,256

(22) Filed: Oct. 7, 2021

(65) Prior Publication Data

US 2022/0029954 A1 Jan. 27, 2022

Related U.S. Application Data (63) Continuation of application No. 15/043,212, filed on Feb. 12, 2016, now Pat. No. 11,165,749.

(51) Int. Cl.
*H04L 61/5007* (2022.01)
*H04L 45/48* (2022.01)
*H04L 45/745* (2022.01)
*H04L 69/22* (2022.01)
*H04L 101/668* (2022.01)
*H04L 101/672* (2022.01)

(52) U.S. Cl.
CPC .......... *H04L 61/5007* (2022.05); *H04L 45/48* (2013.01); *H04L 45/745* (2013.01); *H04L 69/22* (2013.01); *H04L 2101/668* (2022.05); *H04L 2101/672* (2022.05)

(58) Field of Classification Search
None
See application file for complete search history.

(56) References Cited

U.S. PATENT DOCUMENTS

| 2008/0002693 | A1* | 1/2008 | Moki | H04L 45/00 370/390 |
| 2012/0287932 | A1* | 11/2012 | Haddad | H04L 45/04 370/392 |
| 2013/0028095 | A1* | 1/2013 | Vasseur | H04L 45/54 370/241 |

FOREIGN PATENT DOCUMENTS

GB 2415855 A * 1/2006 ....... H04L 29/12254

OTHER PUBLICATIONS

Garner, Bryan, "Black's Law Dictionary" Seventh Edition, p. 289 (Year: 1999).*

(Continued)

Primary Examiner — Robert M Morlan (57) ABSTRACT

A controller assigns variable length addresses to addressable elements that are connected to a network. The variable length addresses are determined based on probabilities that packets are addressed to the corresponding addressable element. The controller transmits, to the addressable elements via the network, a routing table indicating the variable length addresses assigned to the addressable elements. Routers or addressable elements receive the routing table and route one or more packets over the network to an addressable element using variable length addresses included in a header of the one or more packets.

20 Claims, 8 Drawing Sheets

(56) References Cited

OTHER PUBLICATIONS

English Oxford Living Dictionary "Definition of Frequency in English" (Year: 2019).*

* cited by examiner

ASSIGNING VARIABLE LENGTH ADDRESS IDENTIFIERS TO PACKETS IN A PROCESSING SYSTEM

CROSS-REFERENCE TO RELATED APPLICATIONS

The present application is a continuation application of U.S. patent application Ser. No. 15/043,212, entitled "ASSIGNING VARIABLE LENGTH ADDRESS IDENTIFIERS TO PACKETS IN A PROCESSING SYSTEM", and filed on Feb. 12, 2016, the entirety of which is incorporated by reference herein.

BACKGROUND

Field of the Disclosure

The present disclosure relates generally to processing systems, and more particularly, to addressing packets in a processing system.

Description of the Related Art

Distributed processing systems include multiple addressable elements such as networked computers or memory elements connected on a bus. The addressable elements are connected to each other by an interconnection network that includes one or more routers to route packets of data between the addressable elements. For example, when a processing element needs to write information to an addressable memory element, the processing element adds the information to the body of a packet and inserts an address of the addressable memory element in a header of the packet. The processing element may then transmit the packet over the interconnection network to the addressable memory element, which may store the information at a location in the memory element or perform other actions based on the information. In some cases, headers of packets may also include other non-data bits such as metadata associated with the packets. The bits that represent the address (and, if present, the other non-data bits) consume bandwidth of the interconnection network, add to the system latency by increasing the number of cycles required to transmit the packet, and increase the energy consumption due to toggling each bit.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The overhead (and the corresponding bandwidth, latency, and energy consumption) required to move packets of data over an interconnection network between multiple addressable elements may be reduced by assigning variable length addresses to the addressable elements based on a probability that a packet is addressed to the corresponding addressable element. The packet is then routed through the interconnection network based on a variable length address included in a header of the packet. In some embodiments, fixed length addresses assigned to the memory blocks are encoded as variable length addresses using an instantaneous code so that concatenated variable length addresses can be identified without delimiters such as special markers that are inserted into the bit stream between the variable length addresses. For example, Huffman encoding may be used to encode the fixed-length addresses into variable length addresses that are represented by a code tree (or routing table) that includes the fixed-length addresses as leaves. Each addressable element is informed of its unique encoded variable length address. Addressable elements may also forward packets that target other encoded variable length addresses out of corresponding ports. The variable-length addresses of addressable elements that are most likely to be addressed are represented by a smaller number of bits and the variable-length addresses of memory blocks that are less likely to be addressed are represented by a larger number of bits.

Some embodiments use the values of performance counters or activity counters to determine how frequently packets are addressed to the addressable elements. The access frequency may be used to determine the probability that a subsequent packet is addressed to each of the addressable elements. For example, each network port maintains a count of how often each variable length address is seen in a packet that traverses the network link during a time interval. A controller receives information indicating the counts for the network links in the interconnection network on a periodic basis, in response to a request, or in response to another event. In response to receiving this information, the controller generates a new encoding of the fixed length addresses as variable length addresses. The modified encoding is represented as an updated coding tree, which is communicated back to the addressable elements so they can update their internal routing tables to reflect changes in the distribution of memory accesses. Multiple variable-length addresses may be included in a single packet header so that the packet is delivered to multiple addressable elements. The addressable elements may be addressed at a network level by an Internet protocol (IP) address or subnet address, at a system-on-a-chip level by a peripheral identifier, at a memory device level using addresses of memory channels, ranks, banks, rows, or columns, or at other levels such as routes between cell phone towers, radio transmitters, satellites, and the like.

Figure 1:
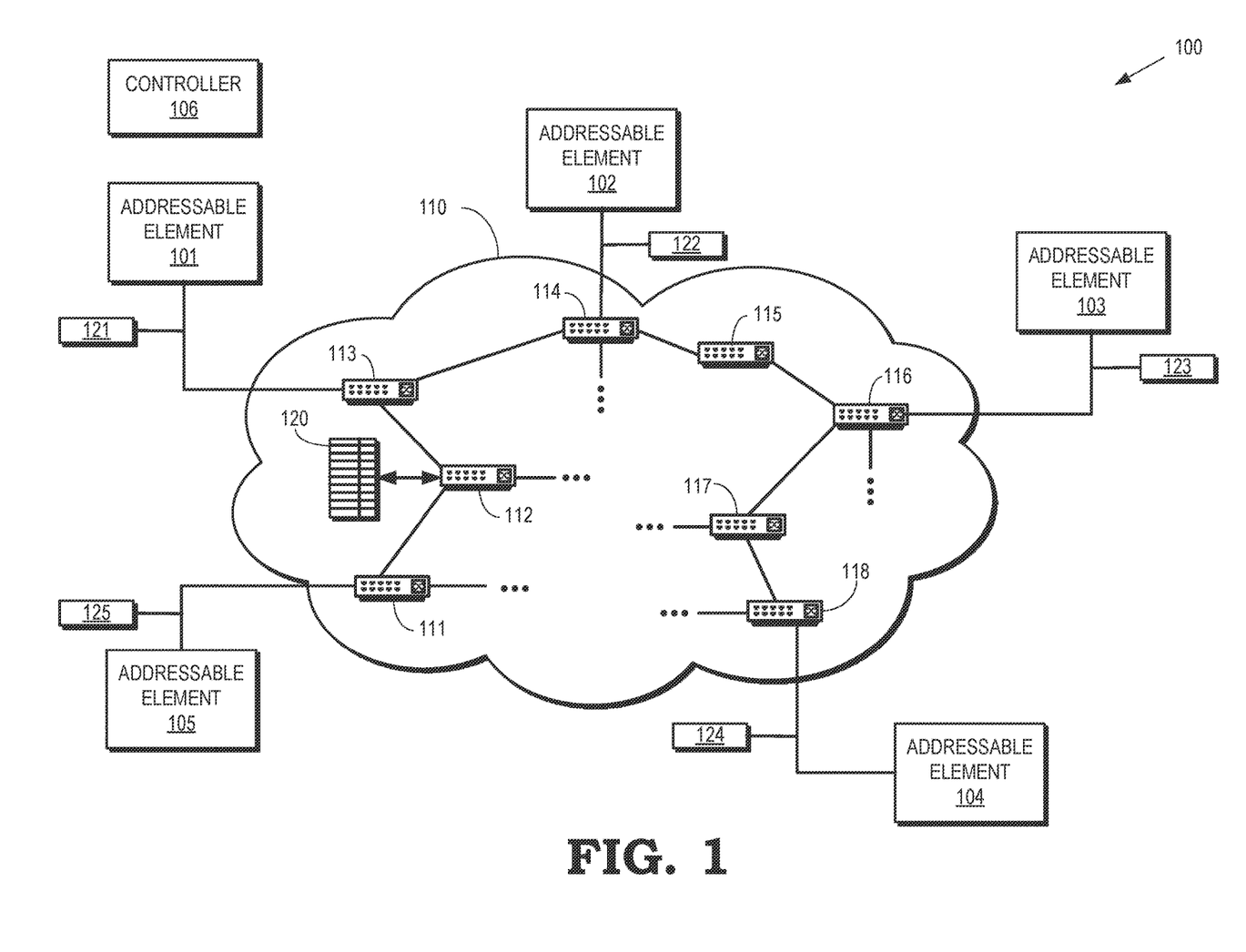
FIG. 1 is a block diagram of a distributed processing system according to some embodiments.

FIG. 1 is a block diagram of a distributed processing system 100 according to some embodiments. The distributed processing system 100 includes addressable elements 101, 102, 103, 104, 105, which are referred to collectively herein as "the addressable elements 101-105." The addressable elements 101-105 may be servers, computers, processing units (such as a central processing unit or graphics processing unit), memory elements such as a dynamic random access memory (DRAM), a router, or any other element that receives, transmits, or processes data packets. As discussed herein, the distributed processing system 100 may be implemented on a network level (as shown in FIG. 1), a system-on-a-chip (SoC) level, or a memory device level.

The distributed processing system 100 includes an interconnect network 110 for conveying data packets between the addressable elements 101-105. The interconnect network 110 includes one or more routers 111, 112, 113, 114, 115, 116, 117, 118 (collectively referred to herein as "the routers 111-118") for routing data packets between the addressable elements 101-105. Each of the routers 111-118 is associated with a routing table that includes information identifying routes to network destinations including other routers 111-118 and the addressable elements 110-105. For example, the router 112 associated with a routing table 120 that identifies routes to the routers 111 and 113, as well as their associated addressable elements 101 and 105, respectively. Some embodiments of the routing table 120 may also include information identifying routes to other entities. Although the routing table 120 is shown as a separate element from the router 112, some embodiments of the router 112 store the routing table 120 using internal memory so that the routing table 120 is an integrated part of the router 112. In the interest of clarity, routing tables associated with the routers 111 and 113-118 are not shown in FIG. 1. Fixed length and variable length addresses may be used to identify the routers 111-118. Some embodiments of the routers 111-118 may be co-located with some embodiments of the addressable elements 101-105.

Activity counters 121, 122, 123, 124, 125 (collectively referred to as "the activity counters 121-125") are used to count the number of times that the corresponding addressable elements 101-105 are accessed via the interconnect network 110. In the interest of clarity, only the activity counters 121-125 at ports of the routers 111, 113, 114, 116, 118 are shown in FIG. 1. However, in some embodiments, there is one activity counter 121-125 per router port to capture activity on all the links in the system 100 so that each link between the routers 111-118 and the addressable elements 101-105 is associated with at least one activity counter. The number of activity counters 121-125 may be reduced by implementing an activity counter at one end of each link between the routers 111-118 as long as the router port associated with the activity counter sees all the traffic on the link. The activity counters 121-125 may be implemented as hardware, firmware, or software associated with network interfaces between the addressable elements 101-105 and the interconnect network 110. The activity counters 121-125 may be implemented as dedicated logic that can be queried by a controller or as a programmable processor. Although the activity counters 121-125 are depicted as being separate from the addressable elements 101-105 and the routers 111-118, some embodiments of the addressable elements 101-105 or the routers 111-118 implement the activity counters 121-125 as an integrated portion of the addressable elements 101-105 or the routers 111-118. For example, the activity counters 121-125 may be part of the network interface or they may be attached to the network interface in some way, e.g., via a host computer chip or SoC. Some embodiments of activity counters 121-125 used for addressable elements 101-105 at the SoC level or memory device level are implemented as counters that are associated with each peripheral block in the chip design, e.g., each counter may be implemented as a register with associated increment/reset and reading logic. Some embodiments of the activity counters 121-125 count the number of accesses on a per-link basis using addresses in the packet headers.

Some embodiments of the activity counters 121-125 are used to determine a frequency at which the corresponding addressable elements 101-105 are accessed. As used herein, the term "access" is used to refer to either transmitting a data packet from an addressable element 101-105 to the interconnect network 110 or receiving a data packet at an addressable element 101-105 from the interconnect network 110. The access frequency may therefore be determined by counting the number of data packets destined for a particular address that are conveyed over an interface between the corresponding addressable element 101-105 or routers 111-118 within a time interval and then dividing the number of data packets by the duration of the time interval. The access frequency may also be determined as an average over more than one time interval, a moving average over a sliding window that represents a time interval, an exponentially weighted moving average of the access frequency, and the like.

Data packets are routed to the addressable elements 101-105 on the basis of addresses included in headers of the data packets. Each of the addressable elements 101-105 is assigned a unique default fixed-length address. Examples of fixed-length addresses include an Internet protocol (IP) address or subnet address that identifies the addressable elements 101-105 at a network level, a peripheral identifier that can address packets to addressable elements at a system-on-a-chip level, addresses of memory channels, ranks, banks, rows, or columns that address packets to addressable elements at a memory device level, and the like. However, as discussed herein, using fixed-length addresses to route data packets through the interconnect network 110 increases the overhead (and the corresponding bandwidth, latency, and energy consumption) required to move the data packets through the interconnect network 110.

Variable length addresses are therefore assigned to the addressable elements 101-105 by a controller 106. Although the controller 106 is depicted as a standalone entity, some embodiments of the controller 106 are implemented in other entities in the distributed processing systems such as the addressable elements 101-105 and the routers 111-118. The variable length addresses are determined based on probabilities that packets are addressed to the corresponding addressable element. The controller 106 determines modified routing tables based on the variable length addresses and then distributes the modified routing tables to the routers 111-118. In some embodiments, the controller 106 transmits a request to pause transmission of packets to the addressable elements 101-105, transmits the modified routing table indicating the modified variable length addresses to the routers, and subsequently transmits instructions to begin transmitting packets to the addressable elements 101-105 according to the modified routing table after a time interval to allow in-flight packets to reach their destination addressable elements 101-105.

Some embodiments of the variable length addresses are represented by an instantaneous code. As used herein, the term "instantaneous code" refers to a code that can be decoded without prior knowledge of the number of bits or symbols in the codeword. Variable length addresses that are encoded as instantaneous codes do not require any additional bits to indicate the length of the address. Concatenated variable length addresses that are encoded as instantaneous codes can be identified without delimiters such as special markers that are inserted into the bit stream between the variable length addresses. For example, the variable length addresses may be determined by Huffman encoding the fixed length addresses of the addressable elements 101-105 based upon the access frequency associated with the addressable elements 101-105, as discussed herein. Multiple instantaneous codes can therefore be decoded from bit sequences that do not include delimiters.

Figure 2:
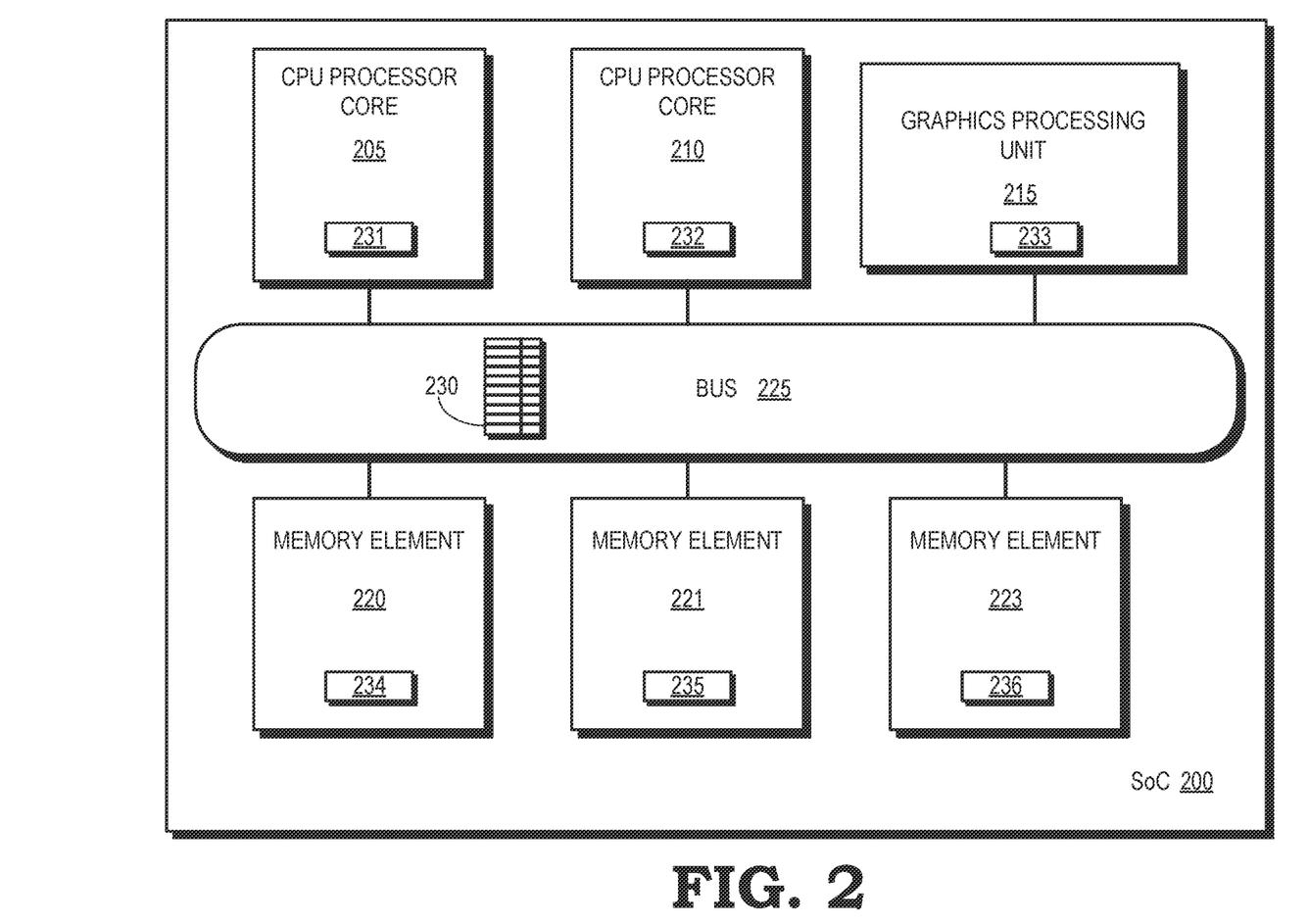
FIG. 2 is a block diagram of a system-on-a-chip (SOC) that implements a distributed processing system including one or more central processing unit (CPU) processor cores, a graphics processing unit (GPU), and memory elements according to some embodiments.

FIG. 2 is a block diagram of a system-on-a-chip (SOC) 200 that implements a distributed processing system including one or more central processing unit (CPU) processor cores 205, 210, a graphics processing unit (GPU) 215, and memory elements 220, 221, 222 according to some embodiments. The memory elements 220, 221, 222 are collectively referred to as "the memory elements 220-222." The CPU processor cores 205, 210 can execute instructions independently, concurrently, or in parallel. The GPU 215 is used for creating visual images intended for output to a display. The memory elements 220-222 are used for storing instructions to be executed by the CPU processor cores 205, 210 or the GPU 215, as well as storing data to be operated on by the instructions and the results of executing the instructions. Although the SoC 200 shown in FIG. 2 includes two CPU processor cores 205, 210, one GPU 215, and three memory elements 220-222, the number of processor cores or memory elements in the SoC 200 is a matter of design choice. Some embodiments of the SoC 200 may include more or fewer than the two CPU processor cores 205, 210, one GPU 215, or three memory elements 220-222 shown in FIG. 2. Some embodiments of the GPU 215 may also include multiple processing cores (not shown).

The SoC 200 includes a bus 225 for conveying data packets between the CPU processor cores 205, 210, the GPU 215, or the memory elements 220-222. Although a single bus 225 is depicted in FIG. 2, some embodiments of the SoC 200 include more than one bus for conveying data packets between entities in the SoC 200. The bus 225 is associated with a routing table 230 that includes information identifying routes between the entities in the SoC 200. Although the routing table 230 is shown as an integrated portion of the bus 225, some embodiments of the SoC 200 store the routing table 230 using memory or registers that are external to the bus 225. The CPU processor cores 205, 210, the GPU 215, and the memory elements 220-222 are each identified by a unique fixed-length address that is used to address packets to the corresponding entity and so these entities may be referred to as addressable elements. Examples of the fixed-length addresses that can be used to identify the entities in the SoC include, but are not limited to, a peripheral identifier, addresses of memory channels, ranks, banks, rows, or columns, and the like.

Activity counters 231, 232, 233, 234, 235, 236 (collectively referred to as "the activity counters 231-236") are used to count the number of times that the corresponding entity is accessed via the bus 225. The activity counters 231-236 may be implemented as hardware, firmware, or software associated with network interfaces between the bus 225 and the other entities in the SoC 200. The activity counters 231-236 may be implemented as dedicated logic that can be queried by a controller or as a programmable processor. As discussed herein, the activity counters 231-236 may be used to determine a frequency at which the corresponding entities are accessed, e.g., by counting the number of data packets that are transmitted over an interface between the bus 225 and the corresponding entity within a time interval and then dividing the number of data packets by the duration of the time interval. The access frequency may also be determined as an average over more than one time interval, a moving average over a sliding window that represents a time interval, an exponentially weighted moving average of the access frequency, and the like.

To reduce the overhead consumed by the fixed-length addresses, a controller assigns variable length addresses to the CPU processor cores 205, 210, the GPU 215, and the memory elements 220-222. The controller may be selected from the CPU processor cores 205, 210, the GPU 215, or other processing unit. As discussed herein, the variable length addresses are determined based on probabilities that packets are addressed to the corresponding addressable element, e.g., using Huffman encoding of the fixed length addresses based upon the associated access frequencies. The controller may update or modify the routing table 230 based on the variable length addresses. As discussed herein, transmission of packets over the bus 225 may be paused to allow in-flight packets to arrive at their destinations before modifying the routing table 230. Transmission of data packets can then resume once the routing table 230 has been updated.

Figure 3:
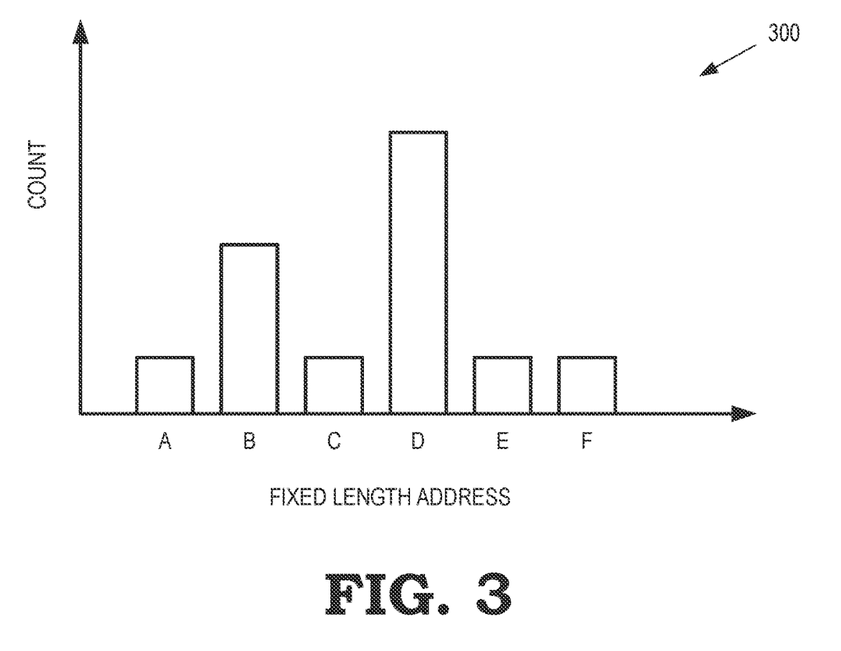
FIG. 3 is a bar graph illustrating counts of numbers of accesses to a set of fixed length addresses according to some embodiments.

FIG. 3 is a bar graph 300 illustrating counts of numbers of accesses to a set of fixed length addresses according to some embodiments. The vertical axis indicates the number of counts in arbitrary units and the horizontal axis identifies the fixed length addresses A, B, C, D, E, and F. The counts are incremented for each access in a predetermined time interval and may therefore be used to generate a corresponding access frequency for each of the fixed length addresses. The fixed length address D has the largest number of counts and the largest access frequency, the fixed length address B has the next largest number of counts and the next largest access frequency, and the fixed length addresses A, C, E, and F have the third largest number of counts and the third largest access frequency.

Figure 4:
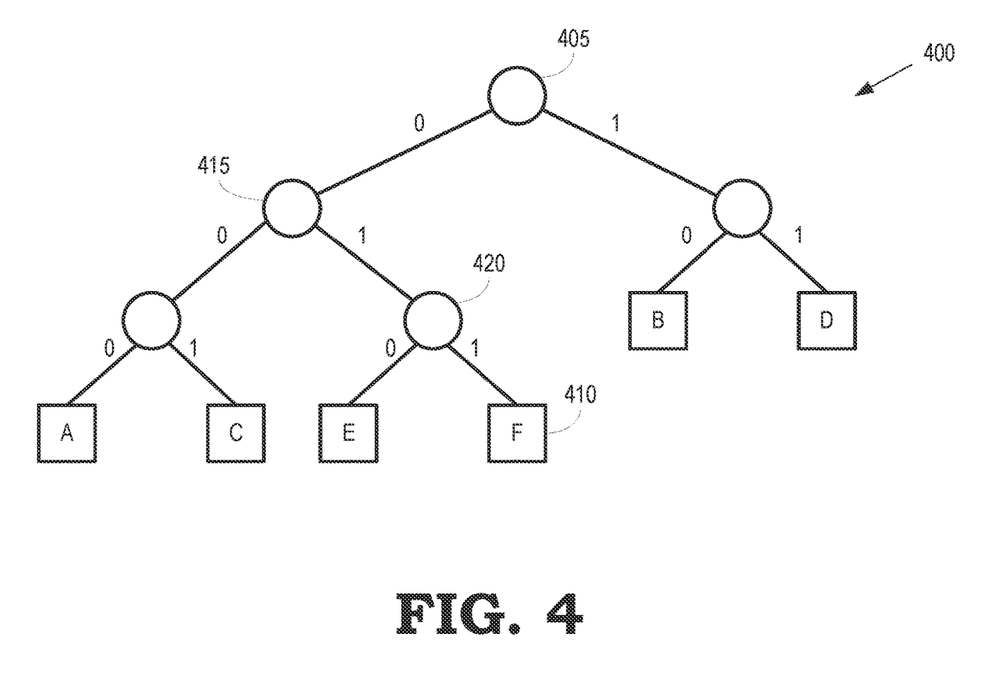
FIG. 4 is a coding tree that encodes variable length addresses corresponding to the set of fixed length addresses according to some embodiments.

FIG. 4 is a coding tree 400 that encodes variable length addresses corresponding to the set of fixed length addresses according to some embodiments. The coding tree 400 is generated by applying Huffman encoding to the fixed length addresses A, B, C, D, E, and F to generate an instantaneous code based on the number of counts or access frequencies associated with each of the fixed length addresses. The shortest variable length addresses are allocated to the most frequently accessed fixed length addresses. For example, the coding tree 400 indicates that the variable length address of the most frequently accessed fixed length address (D) is 11 and the variable length address of the next most frequently accessed fixed length address (B) is 10. Longer variable length addresses are allocated to less frequently accessed fixed length addresses. For example, the Huffman encoded variable length addresses of the fixed length addresses A, C, E, and F are 000, 001, 010, and 011, respectively. Encoding the variable length addresses is an $O(n \log n)$ time complexity algorithm, where n is the number of symbols in the corresponding fixed length addresses.

The mapping of fixed-length addresses to variable-length addresses indicated by the coding tree 400 may be transmitted to the routers or buses and used to populate or modify the routing tables used by the routers or buses to route packets between the addressable elements. Addressable elements may identify packets that are addressed to them by decoding the variable length address in the packet header. In some embodiments, the instantaneous codes that represent the variable length addresses can be decoded in a single clock cycle. For example, Huffman-encoded symbols (such as the fixed length addresses) can be decoded in a single clock cycle. Logically, decoding is performed by following the encoded bit stream from the root node (such as the node 405) of the coding tree 400 tree to the leaves (such as the leaf node 410), outputting each symbol as it is reached. For example, the variable length address 011 is decoded by following the encoded bitstream from the root node 405 to the node 415, the node 420, and the leaf node 410. The fixed length address F is then output as the decoded address. Use of an instantaneous code such as Huffman coding removes the need for transmitting an address length identifier in packet headers, allowing for unbounded scaling of address sizes and reducing header overhead.

Figure 5:
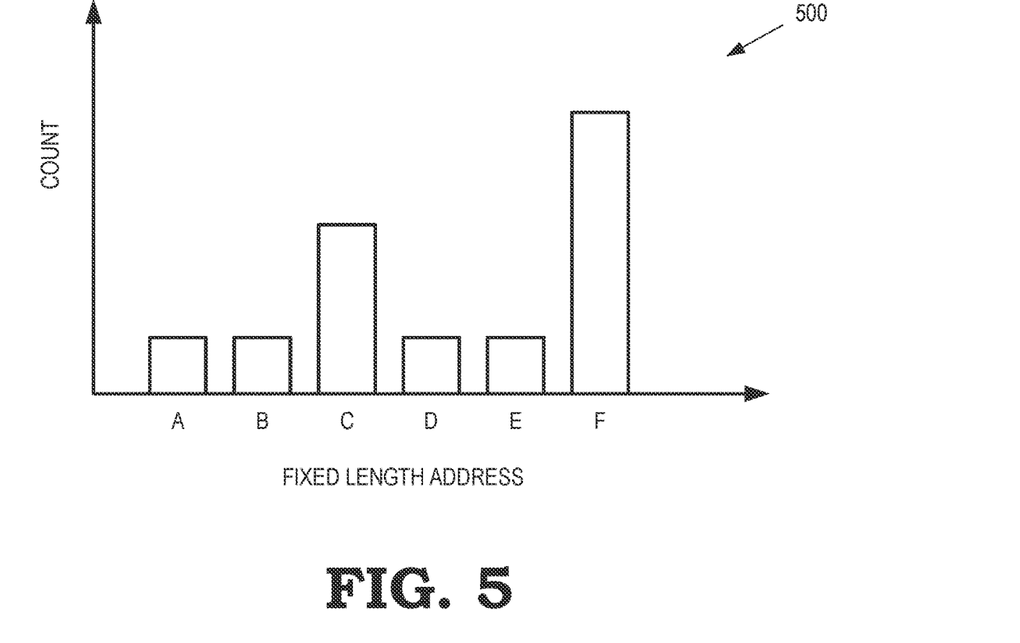
FIG. 5 is a bar graph illustrating counts of numbers of accesses to a set of fixed length addresses for a different time interval than the counts illustrated in the bar graph shown in FIG. 3 according to some embodiments.

FIG. 5 is a bar graph 500 illustrating counts of numbers of accesses to a set of fixed length addresses for a different time interval than the counts illustrated in the bar graph 300 shown in FIG. 3 according to some embodiments. The vertical axis indicates the number of counts in arbitrary units and the horizontal axis identifies the fixed length addresses A, B, C, D, E, and F. The counts are incremented for each access in a predetermined time interval and may therefore be used to generate a corresponding access frequency for each of the fixed length addresses. The fixed length address F has the largest number of counts and the largest access frequency, the fixed length address C has the next largest number of counts and the next largest access frequency, and the fixed length addresses A, B, D, and E have the third largest number of counts and the third largest access frequency.

Figure 6:
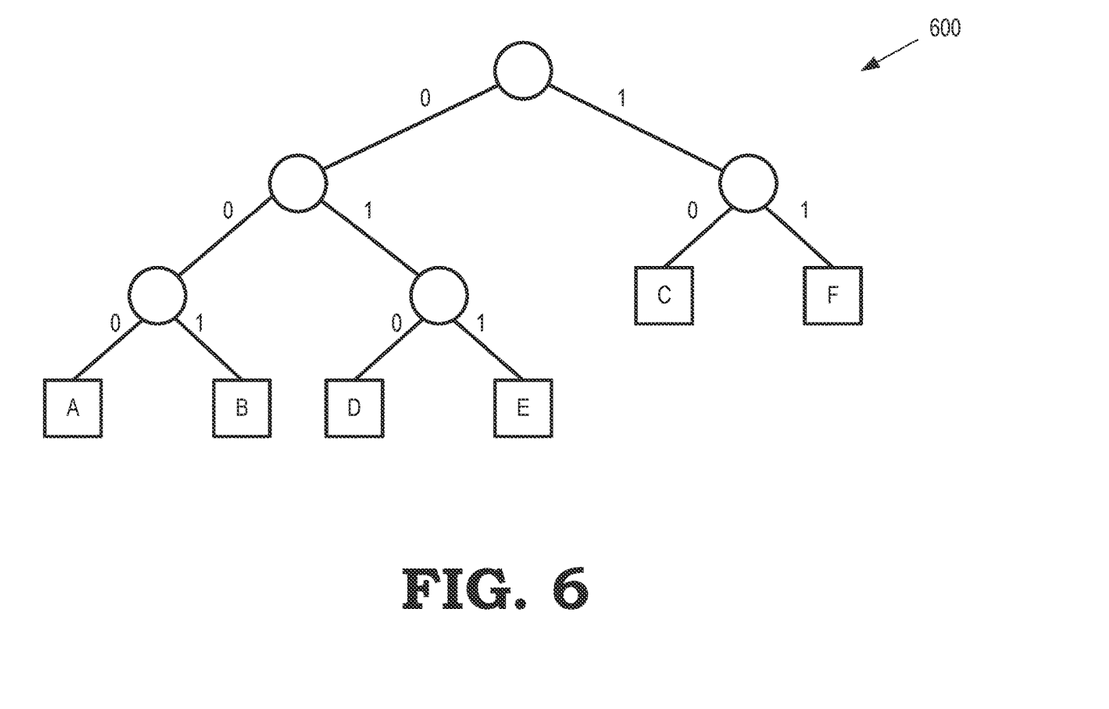
FIG. 6 is a coding tree that encodes variable length addresses corresponding to the set of fixed length addresses according to some embodiments.

FIG. 6 is a coding tree 600 that encodes variable length addresses corresponding to the set of fixed length addresses according to some embodiments. The coding tree 600 is generated by applying Huffman encoding to the fixed length addresses A, B, C, D, E, and F based on the number of counts or access frequencies indicated by the bar graph 500 shown in FIG. 5. The difference in the counts associated with the fixed length addresses (e.g., due to different access frequencies during different time intervals) results in a change in the assignment of variable length addresses to the set of fixed length addresses. For example, the coding tree 600 indicates that the variable length address of the most frequently accessed fixed length address (F) has been reduced from the relatively long address (011) to the shorter address 11, the variable length address of the next most frequently accessed fixed length address (C) has been reduced from the relatively long address 001 to the shorter address 10. The variable length addresses of the fixed length addresses B and D have increased from 10 and 11 to 001 and 010, respectively. The variable length addresses of the fixed length addresses A and E have the same length. The variable length address for the fixed length address A remains 000 and the variable length address for the fixed length address E changed from 010 to 011.

As discussed herein the mapping of fixed-length addresses to variable-length addresses indicated by the coding tree 600 may be transmitted to the routers or buses using their old addresses and used to populate or modify the routing tables used by the routers or buses to route packets between the addressable elements. For example, the system may pause transmissions to allow any outstanding transactions to be completed based on the old address mapping. A controller may then transmit information indicating the updated routing tables using the old variable length address allocations to address the information to the routers or other addressable elements. Once all of the nodes acknowledge receipt of the updated routing tables, the controller broadcasts a run or start message after which normal operation resumes based on the new address mapping.

Figure 7:
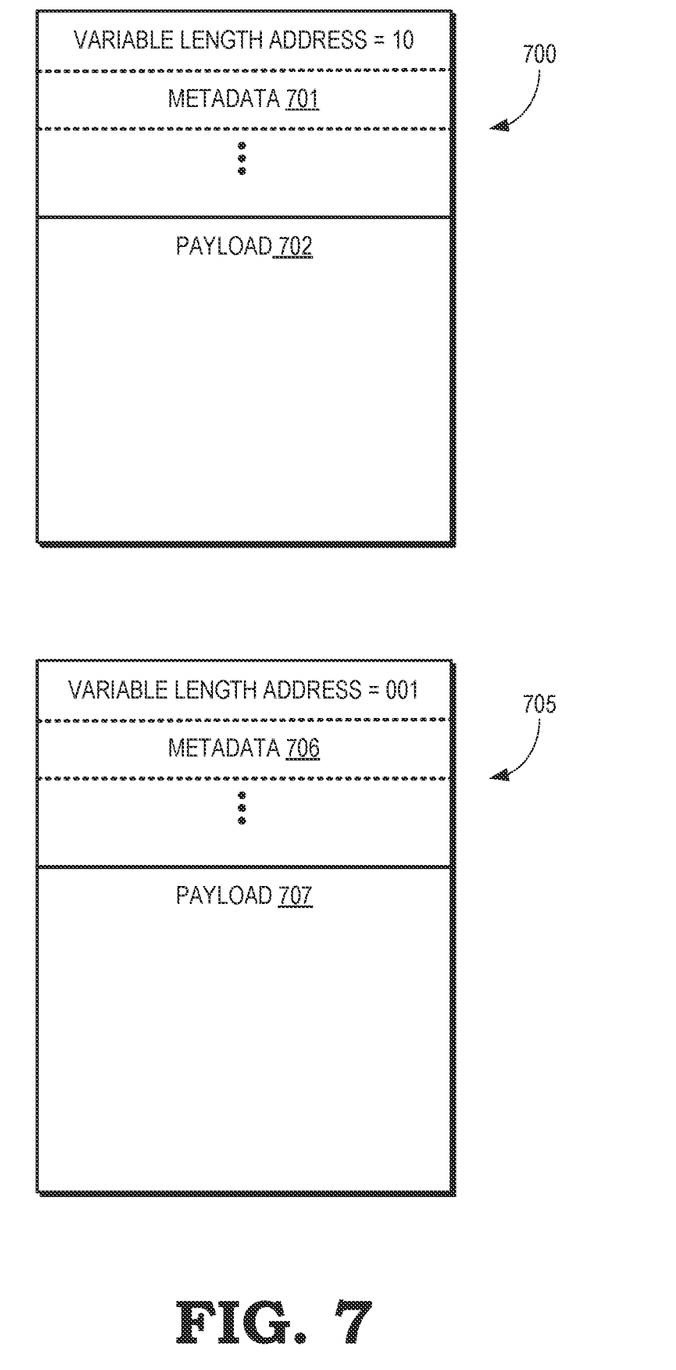
FIG. 7 illustrates packets including variable length addresses encoded based on fixed length addresses of addressable elements according to some embodiments.

FIG. 7 illustrates packets 700, 705 including variable length addresses encoded based on fixed length addresses of addressable elements according to some embodiments. The packet 700 includes one or more fields for transmitting metadata 701 associated with the packet 700. The packet 700 also includes one or more fields for transmitting a payload 702. For example, the payload 702 may include information to be processed or stored by an addressable element such as a processing unit or a memory element. The packet 700 is addressed to an addressable element indicated by the variable length address 10, which is determined by encoding a unique fixed length address that is assigned to the addressable element. For example, the variable length address 10 may indicate the fixed length address B (if the variable length address was encoded based on the coding tree 400 shown in FIG. 4) or it may indicate the fixed length address C (if the variable length address was encoded based on the coding tree 600 shown in FIG. 6). The packet 705 includes fields for metadata 706 and a payload 707. The packet 705 is addressed using the variable length address 001, which may indicate the fixed length address C (if the variable length address was encoded based on the coding tree 400 shown in FIG. 4) or it may indicate the fixed length address B (if the variable length address was encoded based on the coding tree 600 shown in FIG. 6).

Figure 8:
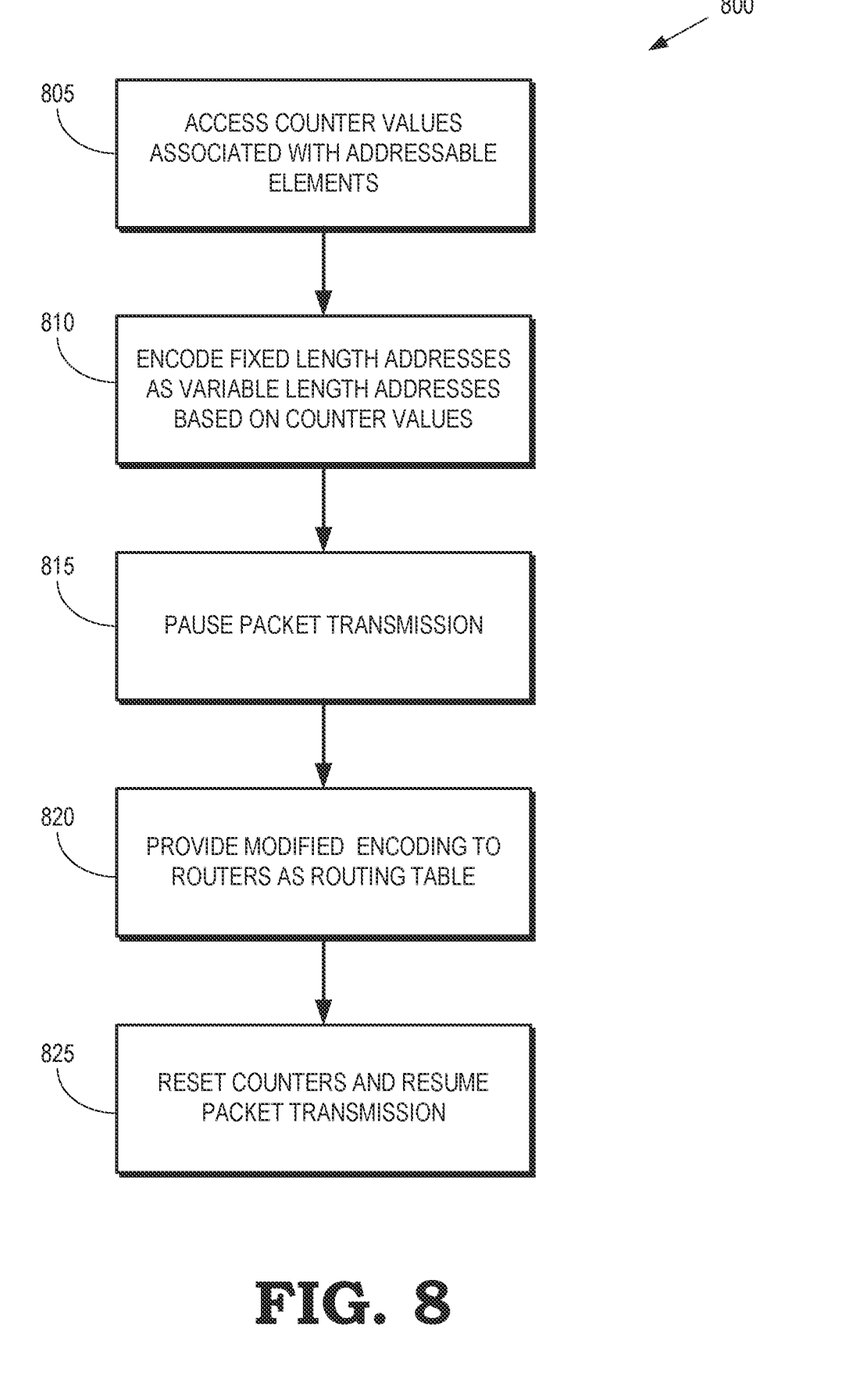
FIG. 8 is a flow diagram of a method of maintaining routing tables on the basis of variable length addresses according to some embodiments.

FIG. 8 is a flow diagram of a method 800 of maintaining routing tables on the basis of variable length addresses according to some embodiments. The method 800 may be implemented by a controller in a distributed processing system. For example, a controller may be selected from among the addressable elements 101-105 or the routers 111-118 in the network-level distributed processing system 100 shown in FIG. 1. For another example, the controller may be selected from among the CPU processor cores 205, 210 or the GPU 215 in the SoC level or memory element level distributed processing system shown in FIG. 2. The distributed processing system includes addressable elements. Each of the addressable elements is assigned a unique fixed length address for use during configuration or when variable-length addresses have not yet been assigned.

At block 805, the controller accesses counter values associated with the addressable elements in the distributed processing system. For example, the controller may access the values in the activity counters 121-125 shown in FIG. 1 or the activity counters 231-236 shown in FIG. 2. At block 810, the controller encodes the fixed length addresses of the addressable elements as variable length addresses based on the counter values associated with the addressable elements. For example, the controller may Huffman encode the fixed length addresses of the addressable elements as variable length addresses that are determined based upon access frequencies for the addressable elements.

At block 815, the controller broadcasts a command that instructs the addressable elements to pause packet transmission. In-flight packets (i.e., packets that have already been transmitted but have not yet arrived at their destinations) have been addressed based upon the previous encoding of the fixed length addresses as variable length addresses. The controller may therefore wait for a predetermined time interval before broadcasting the modified encodings to allow the in-flight packets to reach their destination addressable elements. After the predetermined time interval has elapsed, the method 800 flows to block 820 and the controller provides the modified encoding to routers (or buses) in the distributed processing system. In some embodiments, the routers (or buses) provide an acknowledgment to the controller in response to successfully updating their routing tables based upon the modified encoding. The controller may use the acknowledgment messages to verify that the modified encoding has been successfully received by all the routers (or buses) before proceeding. At block 825, the controller resets the activity counters associated with the addressable elements and broadcasts a command that instructs the addressable elements to resume packet transmission.

The packet address distribution may change over time as a function of workload and workload phase. Some embodiments of the method 800 are therefore iterated. For example, the method 800 may be iterated with a predetermined frequency or in response to an event such as the controller detecting a change in the packet address distribution.

Figure 9:
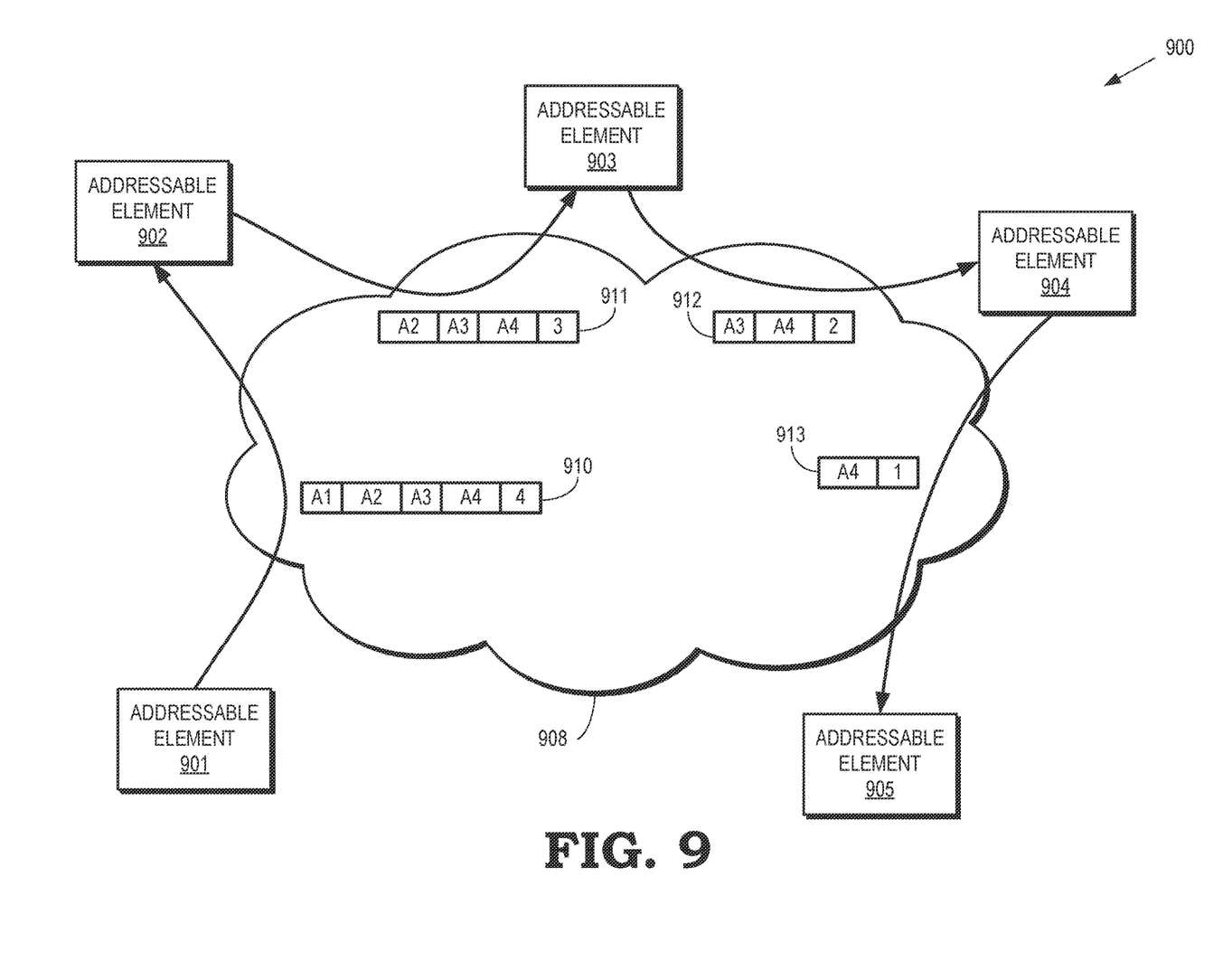
FIG. 9 is a block diagram of a distributed processing system that implements encoding of multi-hop address sequences according to some embodiments.

FIG. 9 is a block diagram of a distributed processing system 900 that implements encoding of multi-hop address sequences according to some embodiments. The distributed processing system 900 includes addressable elements 901, 902, 903, 904, 905, which are referred to collectively herein as "the addressable elements 901-905." The addressable elements 901-905 may be servers, computers, processing units (such as a central processing unit or graphics processing unit), memory elements such as a dynamic random access memory (DRAM), or any other element that receives, transmits, or processes data packets. As discussed herein, the distributed processing system 900 may be implemented on a network level (as shown in FIG. 9), a system-on-a-chip (SOC) level, or a memory device level. The distributed processing system 900 includes an interconnect network 908 for conveying data packets between the addressable elements 901-905. The interconnect network 908 includes one or more routers, which are not shown in FIG. 9 in the interest of clarity.

As discussed herein, each of the addressable elements 901-905 is assigned a unique fixed length address, which may be encoded to form a variable length address depending on a number of accesses or an access frequencies associated with the addressable elements 901-905. The distributed processing system 900 also supports multi-hop addressing. For example, the addressable element 901 may transmit a packet that should be routed to the addressable element 902, the addressable element 903, the addressable element 904, and the addressable element 905. The addressable element 901 therefore appends a packet header 910 to the packet. The packet header 910 includes variable length addresses A1, A2, A3, A4 for the addressable elements 902-904 and an additional field that indicates the number of hops that the packet is to traverse, which corresponds to the number of variable length addresses currently in the packet header 910.

After transmission from the addressable element 901, the packet is routed to the addressable element 902 on the basis of the variable length address A1. The addressable element 902 decodes the variable length address A1 and determines that it is one of the intended recipients of the packet. The addressable element 902 also determines that there are four intended recipients (including itself) based on the field indicating the number of hops. The addressable element 902 therefore removes the variable length address A1 from the packet header 910, decrements the number of hops by one, and transmits the packet including the modified packet header 911.

After transmission from the addressable element 902, the packet is routed to the addressable element 903 on the basis of the variable length address A2. The addressable element 903 decodes the variable length address A2 and determines that it is one of the intended recipients of the packet. The addressable element 903 also determines that there are three intended recipients (including itself) based on the field indicating the number of hops. The addressable element 903 therefore removes the variable length address A2 from the packet header 911, decrements the number of hops by one, and transmits the packet including the modified packet header 912.

After transmission from the addressable element 903, the packet is routed to the addressable element 904 on the basis of the variable length address A3. The addressable element 904 decodes the variable length address A3 and determines that it is one of the intended recipients of the packet. The addressable element 904 also determines that there are two intended recipients (including itself) based on the field indicating the number of hops. The addressable element 904 therefore removes the variable length address A3 from the packet header 912, decrements the number of hops by one, and transmits the packet including the modified packet header 913.

After transmission from the addressable element 904, the packet is routed to the addressable element 905 on the basis of the variable length address A4. The addressable element 905 decodes the variable length address A4 and determines that it is one of the intended recipients of the packet. The addressable element 905 also determines that there are no more intended recipients based on the field indicating the number of hops. The addressable element 905 does not forward the packet.

Figure 10:
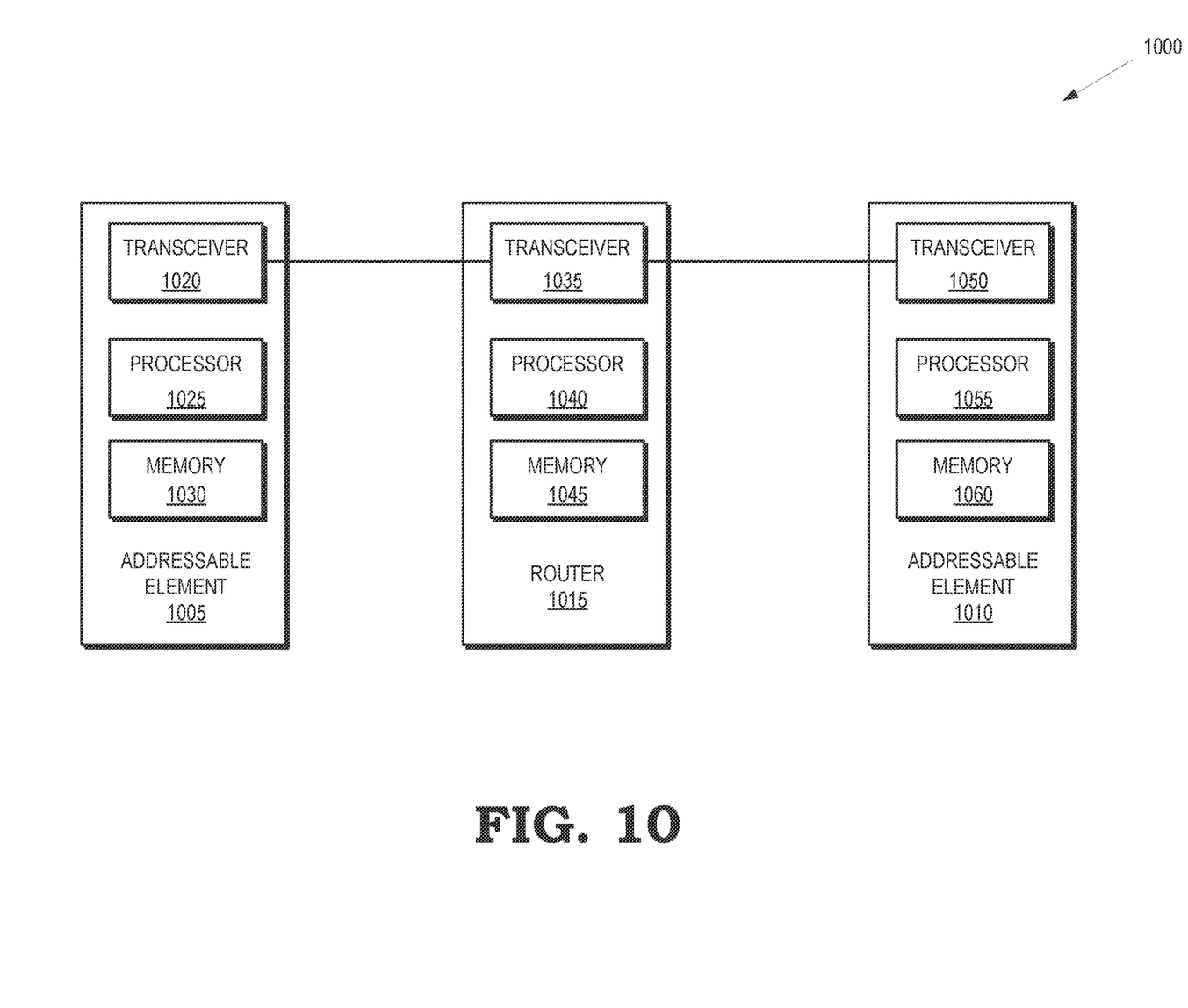
FIG. 10 is a block diagram of a distributed processing system that routes packets between addressable elements based on variable length addresses according to some embodiments.

FIG. 10 is a block diagram of a distributed processing system 1000 that routes packets between addressable elements 1005, 1010 based on variable length addresses according to some embodiments. The distributed processing system 1000 also includes one or more routers 1015 for routing the packets based on the variable length addresses, which may be indicated in a routing table, as discussed herein. In some embodiments, the addressable element 1005 and the router 1015 are co-located in a single entity. The router 1015 may therefore be addressed using the same fixed and variable length addresses as the corresponding addressable element 1005. The co-located addressable element 1005/router 1015 may be used as integrated system building blocks for an unbounded scalable system.

The addressable element 1005 includes a transceiver 1020 for transmitting and receiving signals such as packets that are transmitted to or received from the addressable element 1010 or the router 1015. The addressable element 1005 also includes a processor 1025 and a memory 1030. The processor 1025 may be used to execute instructions stored in the memory 1030 and to store information in the memory 1030 such as the results of the executed instructions. The transceiver 1020, the processor 1025, and the memory 1030 may be configured to perform some aspects of embodiments of the method 800 shown in FIG. 8. For example, the processor 1025 may be configured to encode fixed length addresses as variable length addresses and then assign the variable length addresses to other addressable elements such as the addressable element 1010. The transceiver 1020 may then be used to transmit a routing table that identifies the variable length addresses and the associated addressable elements to the router 1015.

The router 1015 includes a transceiver 1035 for transmitting and receiving signals such as packets that are transmitted to or received from the addressable elements 1005, 1010. The router 1015 also includes a processor 1040 and a memory 1045. The processor 1040 may be used to execute instructions stored in the memory 1045 and to store information in the memory 1045 such as the results of the executed instructions. The transceiver 1035, the processor 1040, and the memory 1045 may be configured to perform some aspects of embodiments of the method 800 shown in FIG. 8. For example, the memory 1045 may be used to store routing tables and the transceiver 1035 may be used to transmit and receive packets according to the information in the stored the routing tables.

The addressable element 1010 includes a transceiver 1050 for transmitting and receiving signals such as packets that are transmitted to or received from the addressable element 1005 or the router 1015. The addressable element 1010 also includes a processor 1055 and a memory 1060. The processor 1055 may be used to execute instructions stored in the memory 1060 and to store information in the memory 1060 such as the results of the executed instructions. The transceiver 1050, the processor 1055, and the memory 1060 may be configured to perform some aspects of embodiments of the method 800 shown in FIG. 8.

In some embodiments, the apparatus and techniques described above are implemented in a system including one or more integrated circuit (IC) devices (also referred to as integrated circuit packages or microchips), such as the distributed processing systems described above with reference to FIGS. 1-10. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for assigning addresses to addressable elements connected to a network including at least one network controller, the method comprising:

in response to receiving respective counts of a number of times each variable length address of a plurality of variable length addresses is identified in a set of packets, generating an encoding of fixed length addresses as variable length addresses for a plurality of addressable elements based on probabilities that packets are addressed to the addressable elements, wherein the probabilities are based on the received respective counts; and transmitting, to a router associated with the plurality of addressable elements, the encoding, wherein the router is configured to update an internal routing table based on the encoding.

2. The method of claim 1, wherein the encoding comprises a coding tree.

3. The method of claim 1, wherein the encoding comprises an encoding according to an instantaneous code so that concatenated variable length addresses are not separated by delimiters.

4. The method of claim 2, wherein the encoding further comprises a Huffman encoding of the fixed length addresses as variable length addresses.

5. The method of claim 1, further comprising:

accessing, from an activity counter associated with the plurality of addressable elements, the respective counts of a number of times each variable length address of a plurality of variable length addresses is identified in a set of packets.

6. The method of claim 1, further comprising:

receiving information indicating frequencies that packets are addressed to the addressable elements; and determining the probabilities that packets are addressed to respective addressable elements based on the frequencies.

7. The method of claim 1, further comprising:

transmitting a request to pause transmission of packets to the addressable elements over the network, wherein transmitting, to the plurality of addressable elements, the encoding is in response to transmitting the request to pause transmission of packets.

8. The method of claim 7, further comprising:

in response to receiving an acknowledgment from the router indicating an update to the internal routing table, resetting an activity counter associated with the plurality of addressable elements.

9. The method of claim 8, further comprising:

broadcasting a command to resume packet transmission to the addressable elements over the network.

10. An apparatus to assign addresses to addressable elements connected to a network, the apparatus comprising:

a processor configured to, in response to receiving respective counts of a number of times each variable length address of a plurality of variable length addresses is identified in a set of packets, generate an encoding of fixed length addresses as variable length addresses for a plurality of addressable elements based on probabilities that packets are addressed to the addressable elements, wherein the probabilities are based on the received respective counts; and a transceiver configured to transmit, to a router associated with the plurality of addressable elements, the encoding, wherein the router is configured to update an internal routing table based on the encoding.

11. The apparatus of claim 10, wherein the encoding comprises an encoding according to an instantaneous code so that concatenated variable length addresses are not separated by delimiters.

12. The apparatus of claim 11, wherein the encoding further comprises a Huffman encoding of the fixed length addresses as variable length addresses.

13. The apparatus of claim 10, wherein the processor is further configured to:

access, from an activity counter associated with the plurality of addressable elements, the respective counts of a number of times each variable length address of a plurality of variable length addresses is identified in a set of packets.

14. The apparatus of claim 10, wherein the processor is further configured to:

receive information indicating frequencies that packets are addressed to the addressable elements, and determine the probabilities that packets are addressed to respective addressable elements based on the frequencies.

15. The apparatus of claim 10, wherein the transceiver is further configured to:

transmit, a request to pause transmission of packets to the addressable elements over the network; and in response to transmitting the request to pause transmission of packets, transmit, to the plurality of addressable elements, the encoding.

16. The apparatus of claim 15, wherein the processor is further configured to:

in response to receiving an acknowledgment from the router indicating an update to the internal routing table, reset an activity counter associated with the plurality of addressable elements.

17. The apparatus of claim 16, the transceiver further configured to:

broadcast a command to resume packet transmission to the addressable elements over the network.

18. A method for assigning addresses to addressable elements connected to a network including at least one network controller, the method comprising:

modifying an encoding of fixed length addresses as variable length addresses for a plurality of addressable elements based on probabilities that packets are addressed to the addressable elements, wherein the probabilities are based on respective counts of a number of times each variable length address of a plurality of variable length addresses is identified in a set of packets; and transmitting, to a router associated with the plurality of addressable elements, the encoding, wherein the router is configured to update an internal routing table based on the encoding.

19. The method of claim 18, further comprising:

requesting, the respective counts from counters associated with the addressable elements.

20. The method of claim 19, further comprising:

periodically receiving the respective counts from counters associated with the addressable elements.

* * * * *